United States Patent
Oplatka

[11] 3,743,256
[45] July 3, 1973

[54] DEVICE FOR EVAPORATIVE COOLING TOWERS WITH WETTED WALLS

[75] Inventor: Georg Oplatka, Zurich, Switzerland

[73] Assignee: Aktiengesellschaft Brown, Doveri & Cie, Baden, Switzerland

[22] Filed: Aug. 5, 1971

[21] Appl. No.: 169,346

[30] Foreign Application Priority Data
Aug. 20, 1970 Switzerland.................... 12501/70

[52] U.S. Cl............. 261/98, 261/103, 261/DIG. 11, 261/112, 261/111
[51] Int. Cl.................................................. B01f 3/04
[58] Field of Search.......................... 55/240, 241; 210/150; 261/DIG. 11, 111, 112, 94, 95, 98, 103

[56] References Cited
UNITED STATES PATENTS

| | | | |
|---|---|---|---|
| 2,194,711 | 3/1940 | Meyer et al.................. | 261/111 X |
| 2,405,594 | 8/1946 | Melvill........................... | 261/95 |
| 2,424,248 | 7/1947 | Melvill........................... | 261/95 |
| 3,416,775 | 12/1968 | Szucs et al..................... | 261/112 |
| 3,468,521 | 9/1969 | Furlong et al................. | 261/111 |
| 3,643,931 | 2/1972 | Henning et al................. | 261/111 |

Primary Examiner—Tim R. Miles
Assistant Examiner—Richard L. Chiesa
Attorney—Pierce, Scheffler & Parker

[57] ABSTRACT

A wetted wall structure for use in a cooling tower of the evaporative type wherein water flowed downwardly over the walls arranged vertically is cooled by air flowing between the walls comprises, for each wetted wall, a vertical splash-plate to the bottom edge of which is attached a non-woven grid consisting of parallel spaced vertical rods and parallel spaced horizontal rods. The water to be cooled issues from one or more supply pipes, depending upon the width of the splash-plate, its velocity and the angle of impingement on the plate, spreads gradually as it flows downwardly over the plate and thence flows downwardly over the grid in an unbroken film.

10 Claims, 3 Drawing Figures

Patented July 3, 1973 3,743,256

DEVICE FOR EVAPORATIVE COOLING TOWERS WITH WETTED WALLS

The present invention relates to an improved device for evaporative cooling towers for cooling water by means of air, with wetted walls down which the water runs and between which the air flows.

Evaporative cooling towers are used in areas where water is in short supply to remove the waste heat from thermal power plants and contain a variety of devices for distributing the water to be cooled. These internal devices are arranged horizontally or vertically, are made of metal, plastic material or ceramic and take the form of panels, lattices or three-dimensional assemblies. The aim is to achieve a large surface area of water in order to promote heat and mass transfer (i.e., evaporation of the water) and at the same time maintain a low resistance to the flow of air. Most cooling towers work on the crossflow or counterflow principle, and often on a combination of the two.

Internal devices are known (German Pat. No. 1,253,294) which consist of a wide-mesh interwoven lattice coated with a hardening plastic which partly closes the meshes of the lattice. This means that a liquid film forms on both sides of the device, but that only the film on the outer side is cooled. The patentee is clearly aware of this drawback since he emphasizes the need to make the surface rough in order to retard the downward flow of water. The surface irregularities, especially the intersection points of the interwoven lattice, encourage the formation of drops which separate from the liquid film and are entrained in the air flow. This causes not only a considerable loss of water, but also an inferior cooling effect, because the air acquires additional heat from the entrained drops and is thus less able to cool the descending water. Also, the roughness and unevenness of the wetted surface do not allow a film of uniform thickness. Cooling of the liquid is therefore non-uniform.

The disadvantage of cooling only on the outer side of the liquid film, or of tWice the film thickness, also applies to wetted panels (German Pat. No. 1,196,218), and the situation is not really improved by perforations. If an interwoven lattice is used instead of panels, it is true that with good liquid distribution an unbroken film forms initially, but because of the intersections in the lattice the film soon breaks up, leading to concentrations of liquid, in the form of rivulets, and unwetted portions of the lattice, i.e., to uneconomical cooling and poor utilization of the internal devices.

A further problem lies in distributing the liquid over the width of each wetted element in such a way that a uniform film of liquid is formed. A known solution consists in providing a water-distribution channel at the upper edge of a panel (German Pat. No. 1,253,294), the channel having two rows of holes in order to feed water to both sides of the panel. The disadvantage in this case is that the water is divided into a number of rivulets which flow freely down the panel, and again an unbroken film of liquid does not form. In addition, there is the danger of contamination and blockage, which is particularly acute when the holes are small.

A technique is also known whereby the upper edge of a wetted lattice is made in the form of a watershed (German Pat. No. 1,196,218). To produce a film of water extending over the whole width wIth such a device, the edge must be made extremely accurately and be perfectly horizontal, which incurs such expenditure as to be no longer in accord with the task at hand. Alternatively, a large volume of water would have to be delivered across the edge, which would not allow a thin film to form.

With none of the known solutions for the internal devices can it be guaranteed that a thin film of liquid of uniform thickness will form and flow at uniform speed to the bottom of the device. The film is irregular and breaks up, so that parts of the wetted surfaces are not utilized, drops break away and are lost, and the cooling effect never attains its optimum.

The principal object of this invention is to ensure creation of a uniformly thick film of water which remains unbroken to the bottom of the wetted wall, descends at a uniform velocity, is exposed on both sides to air flow and is sufficiently stable to prevent separation of drops.

This objective is achieved in that each wetted wall has a vertical splash-plate to the bottom edge of which a grid of small thickness consisting of vertical and horizontal rods is connected, the water to be cooled flows in a free jet from at least one supply pipe to impinge on the splash-plate at an acute angle, and the number of supply pipes is in accordance with the width of the wetted wall.

The grid of rods ensures a thin film of water which, despite great turbulence, remains uninterrupted and does not break away. Drops are not torn away even though the air flows unhindered along the film on both sides. This satisfactory situation persists even when the wetted wall is moderately inclined, and the best possible use is made of the available wetted surface area. With the improved device according to the invention it is possible to improve the characteristic values of heat and mass transfer for the same, or even lower air resistance, so that the geometric dimensions of the cooling tower, and hence also its construction cost, can be lowered for the same heat capacity. In the case of a lower tower the work done by the pumps will also be less because the distance between upper and lower water containers will be smaller. The wetted walls are simple to make and require no maintenance, while the water supply and distribution systems are inexpensive and reliable. Dividing the wetted walls into separate elements results in low weight, which facilitates assembly and dismounting.

The foregoing, as well as other objects and advantages inherent in the invention will become more apparent from the following detailed description of preferred embodiments and the accompanying drawings wherein.

Figure 1:
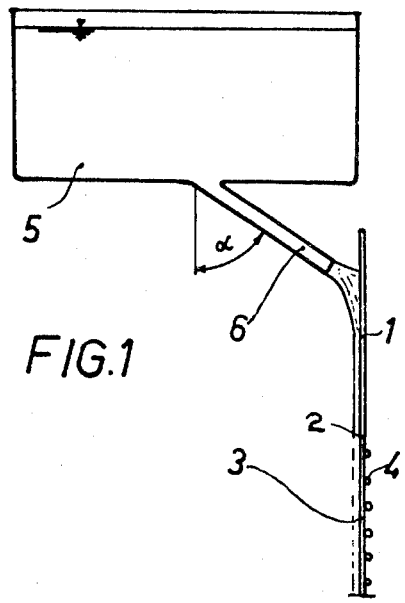
FIG. 1 is a view in side elevation of a vertical wetted wall together with its water supply and a rod type grid in accordance with the invention depending from the lower edge of a splash-plate to which the water is supplied.
Figure 2:
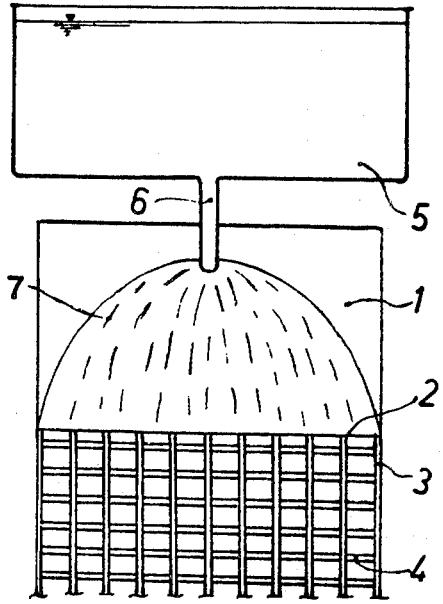
FIG. 2 is a view in front elevation of the wetted wall structure and depicted in FIG. 1.

As shown in FIGS. 1 and 2 a wetted wall element consists of a vertically disposed splash-plate 1, to the lower edge 2 of which a grid of continuous parallel vertical rods 3 and continuous parallel horizontal rods 4 is suitably connected. From a reservoir 5, e.g. a water-distribution channel, water flows through a supply pipe 6, set at an acute angle $\alpha$, to the vertical to impinge on splash-plate 1, where it ultimately spreads over the width of the splash-plate and flows down over the grid 3,4.

The rods 3,4, of the grid may be of metal, plastic material or ceramic, and joined by soldering, spot welding, glueing or sintering, but may not be interwoven, since this would cause the water film to break away. The rods may be of round or rectangular cross-section or of any other suitable profile. It has been found that round rods of 1.5 mm diameter and a mesh of 10 × 10 mm, for example, permit formation of an unbroken film of water which can attain a flow velocity of approximately 0.3 m/sec.

On striking splash-plate 1 the water jet gradually spreads over the width of the splash-plate as indicated by the streamlines 7. This width depends principally on the angle of incidence of the water jet and on the pressure at which it leaves supply pipe 6. The greater the angle to the vertical at which the jet strikes the splash-plate, the greater is the spread of the water. The maximum is attained close to a right angle.

The lateral spacing between supply pipes (only one being shown) is to be chosen in accordance with the width of spread. If the pipes are too close together, the respective water films will overlap, resulting in concentrations of water which persist in a downward direction and in which the water is inadequately cooled. If adjacent water supply pipes are too far apart, the respective water films no longer touch and strips down the wetted walls remain devoid of water. The available wall area, and hence the space, are then poorly utilized, and the air flowing between the walls cannot cool the water to optimum effect.

Tests have shown that with a head of 4 meters, water flows from a supply pipe of 20 mm inside diameter at a rate of approximately 2 kg/sec. which, at an angle of incidence of 60° to the splash-plate, spreads over a width of 1 m across the splash-plate and is evenly distributed over the following grid.

The wetted wall can be divided into strips, the width of which is determined by the water distribution occurring in each specific case, although each such element can also be two or more times as wide, with an equivalent number of supply pipes.

Air can be fed to the descending water in a cross-flow or counterflow arrangement, the objective always being to achieve turbulence of the air in order to ensure effective heat and mass transfer. In the case of a cross-flow arrangement, the wetted walls are set essentially radially in the cooling tower. Round the whole periphery of the tower the air flows inwards towards the axis of the tower and thus flows over the surface of the water film. A number of geometrical configurations of the wetted walls are possible, as can be seen in FIG. 3, where in all examples the walls are divided into individual elements; in many cases, however, they can also consist of a single unit.

In Group A the wetted wall elements are disposed in a purely radial arrangement relative to the axis of the water tower. Again in Group B the individual wall elements are set radially but are staggered instead of along continuous radial lines. This has the effect of increasing the turbulence of the air, thus improving the cooling effect, while the flow resistance is only slightly greater. This is even more pronounced in the case of Group C, where the individual wall elements are arranged in zig-zag fashion. Group D shows a volute-like arrangement, which has the advantage that the channels can be made of the same air-flow cross-section, whereas they otherwise become narrower towards the center.

Various arrangements are also possible when the counterflow principle is employed. With these the space between neighboring wetted walls is always kept small to force the air into intimate contact with the water.

Figure 3:
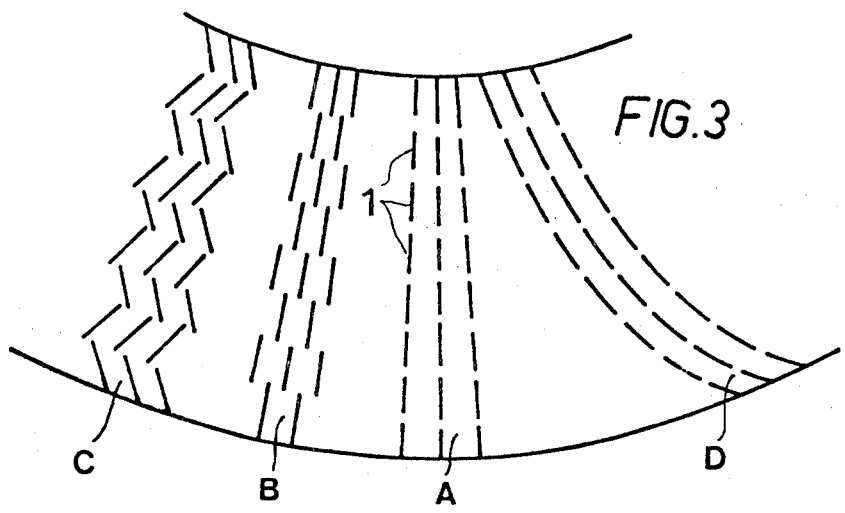
FIG. 3 is a part of a horizontal section of a cooling tower in plan view.

In any of the wall configurations depicted in FIG. 3, each wall section 1 is preferably of the construction and dimensions illustrated in FIGS. 1 and 2 and the water velocity such that one water supply pipe delivering water to the splash-plate at the center is sufficient to distribute the desired water film over the entire width of the plate by the time it reaches the rod grid.

I claim:

1. A wetted wall structure for use in a cooling tower of the evaporative type which comprises a substantially vertically arranged splash-plate, a grid constituted by a non-woven assembly of parallel spaced vertical and horizontal rods depending from the lower edge of said splash-plate, and means forming a downward flow of water spread over the surface of said splash-plate and which is then flowed downwardly over the surface of said grid in the form of an unbroken film.

2. A wetted wall structure as defined in claim 1 wherein said grid is constituted by arrays of rectilinear vertical and horizontal rods secured to each other.

3. A wetted wall structure as defined in claim 1 wherein said means for forming the downward flow of water over the surface of said splash-plate is constituted by water supply pipe means directing water onto the surface of said splash-plate at an acute angle.

4. A wetted wall structure as defined in claim 3 wherein one water supply pipe is utilized for said splash-plate and is directed onto the surface of the splash-plate at a point equidistant from the side edges thereof so as to spread gradually across the entire width of the splash-plate as it flows downwardly.

5. A cooling tower comprising A plurality of wetted wall structures each as defined in claim 4 and which are arranged in the tower according to a geometrical configuration.

6. A cooling tower as defined in claim 5 wherein said wetted wall structures are arranged radially in the tower relative to the tower axis.

7. A cooling tower as defined in claim 6 wherein said wetted wall structures are arranged along continuous radial lines.

8. A cooling tower as defined in claim 5 wherein said wetted wall structures are arranged along radial lines, the wall structures along one radial line being staggered with relation to the wall structures located along an adjacent radial line.

9. A cooling tower as defined in claim 5 wherein said wetted wall structures are arranged along essentially radial lines in relation to the tower axis but wherein the wetted wall structures along each line are set zig-zag to each other.

10. A cooling tower as defined in claim 5 wherein said wetted wall structures are arranged in said tower along volute lines in relation to the tower axis.

* * * * *